United States Patent [19]
Buck

[11] 3,778,071
[45] Dec. 11, 1973

[54] FLOATING TOOL HOLDER

[75] Inventor: James R. Buck, Ross Township, Kalamazoo County, Mich.

[73] Assignee: Buck Tool Company, Kalamazoo, Mich.

[22] Filed: Jan. 31, 1972

[21] Appl. No.: 222,359

[52] U.S. Cl.................. 279/16, 10/89 F, 10/107 F
[51] Int. Cl............................................ B23b 31/08
[58] Field of Search.......................... 279/16; 64/31; 10/89 F, 107 F

[56] References Cited
UNITED STATES PATENTS

| | | | |
|---|---|---|---|
| 2,416,586 | 2/1947 | Jones.................................... | 279/16 |
| 2,063,753 | 12/1936 | Pohlman........................... | 279/16 X |

*Primary Examiner*—Francis S. Husar
*Attorney*—Woodhams, Blanchard & Flynn

[57] ABSTRACT

An improved floating tool holder assembly having an annular tool holder adapted to receive therein the shank of a suitable tool, such as a drill or reamer. The tool holder is pivotally mounted on an intermediate support for permitting limited pivotal movement of the tool holder about a first axis perpendicular to the longitudinal axis of the tool. The intermediate support is in turn pivotally mounted upon a surrounding housing for permitting the intermediate support to pivotally move about a second axis which is perpendicular to the longitudinal axis of the tool, the second axis also being substantially perpendicular to the first axis. Suitable resilient compression members are disposed between the housing and the intermediate support at the points of pivotal connection therebetween, and further resilient compression members are disposed between the intermediate support and the tool holder at the points of pivotal connection therebetween, whereby the tool holder can also float laterally a limited amount to compensate for irregularities or misalignment between the tool and the workpiece.

9 Claims, 5 Drawing Figures

FLOATING TOOL HOLDER

FIELD OF THE INVENTION

This invention relates to a tool holder assembly and, in particular, to an improved floating tool holder assembly having resilient compression members associated with the assembly for permitting limited lateral shifting and universal pivoting movement of the tool to compensate for angular or lateral irregularities on the workpiece.

BACKGROUND OF THE INVENTION

Floating tool holder assemblies have long been used for permitting alignment of a tool with a workpiece when a second operation is to be performed on the workpiece, such as the reaming or tapping of a bored hole in the workpiece. Since the bore formed in the workpiece is often laterally and/or angularly misaligned relative to the tool, the tool must be capable of floating in order to properly align with the bore to permit the second operation to be properly performed. While floating tool holder assemblies capable of permitting angular displacement of a tool have previously been used, most of these prior known floating work holder assemblies have been structurally and mechanically complex and thus have been costly and inefficient to manufacture and use. Further, the prior known devices have not provided a rigid support of the tool, whereby the tool is thus often subject to vibration and chatter, which substantially shortens the useful life of the tool and also often results in breakage of the tool.

Accordingly, it is an object of the present invention to provide a floating tool holder assembly which overcomes the disadvantages of the prior known devices and which is able to both laterally and angularly compensate for misalignment of the tool relative to the workpiece while at the same time also effectively overcoming vibration and chatter.

A further object of the present invention is to provide a floating tool holder assembly, as aforesaid, which utilizes a universal joint structure for supporting the tool holder to permit limited angular movement thereof in any direction, with the universal joint structure further including resilient means for permitting lateral displacement of the tool holder while at the same time always causing the tool holder to be automatically recentered after the tool has been disengaged from the workpiece.

Still a further object of the present invention is to provide an improved floating tool holder assembly, as aforesaid, which is easy and economical to manufacture, and which is efficient to operate.

These and other objects of the present invention will be apparent to persons acquainted with devices of this type upon reading the following specification and inspecting the accompanying drawing.

Figure 1:
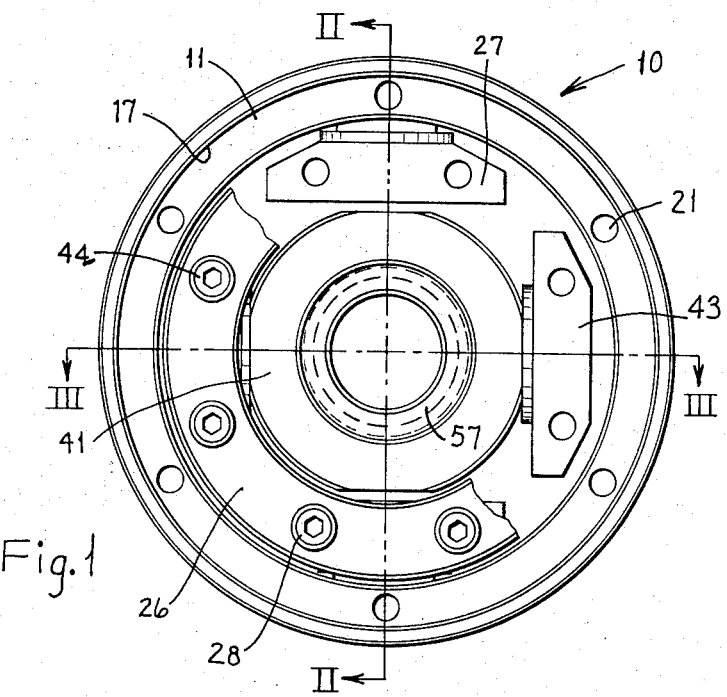
FIG. 1 is an end view of the improved floating tool holder assembly constructed according to the present invention.

Certain terminology will be used in the following description for convenience in reference only and will not be limiting. The words "upwardly," "downwardly," "rightwardly" and "leftwardly" will designate directions in the drawings to which reference is made. The words "front" and "rear" will also be used to make reference to the opposite ends of the tool holder assembly and will particularly refer to the right and left ends, respectively, as appearing in FIGS. 2 and 3. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the present invention are met by providing a floating tool holder assembly which includes a tool holder supported on a housing by an intermediate universal joint structure. The universal joint structure includes an annular support member disposed between the housing and the tool holder. The support member is pivotally connected to the housing by a pair of diametrically opposite and coaxially aligned pivot pins for enabling the support member to pivotally move about a first axis which is substantially perpendicular to the rotational axis of the tool. The tool holder is pivotally supported on the support member by a further pair of diametrically opposite and coaxially aligned pivot pins which are interconnected between the tool holder and the support member for permitting relative pivotal movement therebetween about a second axis which is substantially perpendicular to both the first axis and the rotational axis of the tool. The aligned pins are preferably supported for both rotation and axial displacement with suitable bearings. Resilient compression members coact between the tool holder and the intermediate support member for permitting limited lateral displacement of the tool holder relative to the support member in a direction parallel to said second axis. Similar resilient compression members coact between the support member and the housing for permitting limited lateral movement of the support member relative to the housing in a direction parallel to said first axis. The resilient compression members permit the tool holder to be radially displaced in any direction relative to the rotational axis of the tool, while causing both the support member and the tool holder to again be properly recentered after the tool has disengaged the workpiece.

DETAILED DESCRIPTION

Figure 2:
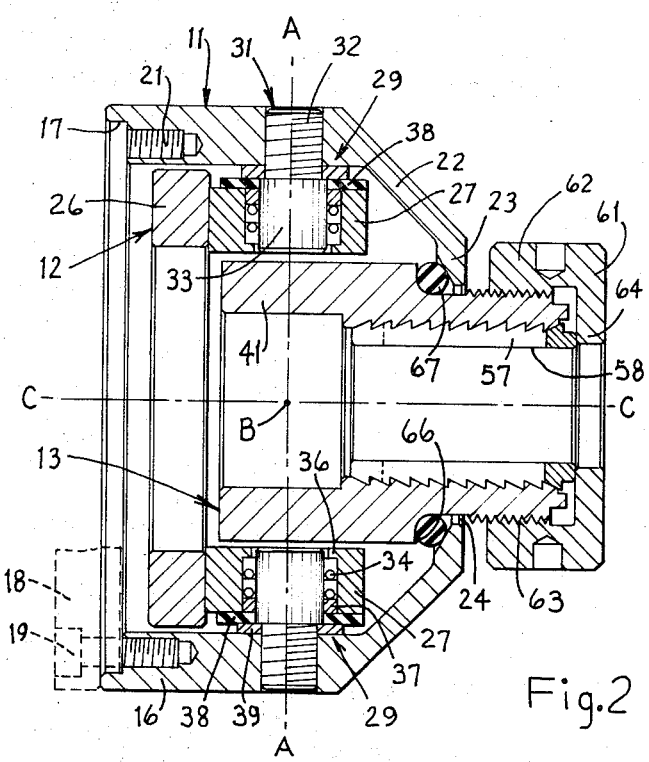
FIG. 2 is a sectional view of the tool holder as taken along the line II—II of FIG. 1.
Figure 3:
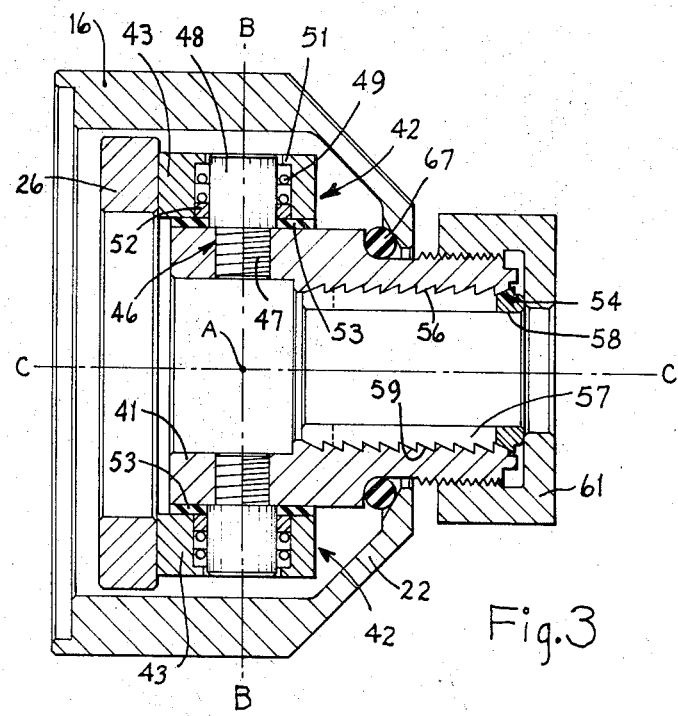
FIG. 3 is a further sectional view taken along the line III—III of FIG. 1.

FIGS. 1–3 illustrate therein an improved floating tool holder assembly 10 constructed according to the present invention. The tool holder assembly 10 includes an annular housing 11 having an intermediate support 12 pivotally mounted thereon. The intermediate support 12 in turn has a tool holder 13 pivotally mounted thereon, which tool holder is adapted to engage and support the shank of a suitable machine tool, such as a tap or reamer.

The housing 11 specifically includes an annular cylindrical sleeve portion 16 having a recess 17 formed in the rearward end thereof, whereby said housing is adapted to be concentrically seated on a conventional mounting plate, such as a rotating spindle plate 18, with the housing 11 being fixedly secured thereto by any conventional means, such as by screws 19 extending through the spindle plate and extending into threaded openings 21 formed in the housing 11. The housing 11 also includes a conical sleeve portion 22 fixedly secured to the forward end of the cylindrical portion 16. The conical portion 22 converges as it extends forwardly of the holder assembly and terminates in an annular enlarged lip 23 adjacent its free end, which lip defines a central opening 24 extending through the forward end of the housing.

The housing 11 is disposed in surrounding relationship to the intermediate support 12, which intermediate support 12 includes a ring 26 disposed adjacent the rearward end of the housing. The ring 26 has a pair of diametrically opposite bearing blocks 27 fixedly secured to one axial end face thereof, as by screws 28.

The intermediate support 12, particularly the ring 26, is pivotally supported on the housing 11 by a pair of opposed, substantially identical pivot devices 29. Each pivot device 29 includes a pivot pin 31 which has a threaded shank portion 32 threadably disposed within a threaded aperture formed in the housing 11, whereby the pivot pin 31 is fixedly secured to an projects radially inwardly of the housing 11. Each pivot pin 31 also has an enlarged cylindrical head portion 33 formed on the radially inner end thereof and disposed within an enlarged opening formed in a respective one of the bearing blocks 27. A suitable antifriction device, particularly a ball bearing 34, is provided between the bearing block 27 and the cylindrical head portion 33 for permitting the intermediate support member 12 to pivot about the axis A defined by the pins 31.

The bearing assembly 34 is retained by means of a lip 36 formed on the bearing block for axially restraining one end of the bearing assembly. The other end of the bearing assembly 34 is maintained in position by means of an annular retainer 37. The lip 36 and retainer 37 do not axially secure the pin 31 relative to the bearing block 27, and thus the bearing block is able to move a limited amount in the axial direction of the pin. However, any substantial lateral movement of the intermediate support member 12 relative to the pins 31 is restricted by means of annular compression washers 38 and annular spacers 39, which washers and spacers encircle the pins 31 and are disposed between the inner surface of the housing 11 and the outer surface of the bearing block 27 as illustrated in FIG. 2. The compression washers 38 are preferably constructed of a resilient rubber-like material, such as either plastic or rubber, whereby the compression washers 38 thus maintain the intermediate support 12 properly centered relative to the housing 11 in the direction of the axis A. The compression washers 38 will, however, permit limited lateral displacement of the intermediate support 12 relative to the housing 11 in the direction of the axis A.

The tool holder 13 is disposed substantially concentrically within the intermediate support 12 and is in turn pivotally connected thereto whereby the tool holder is pivotal relative to the intermediate support about a second transverse axis B. The tool holder 13 includes an elongated sleeve-like arbor 41 which, adjacent its rearward end, is pivotally connected to the ring 26 by a pair of opposed, substantially identical pivot devices 42 (FIG. 3). The pivot devices 42 coact with a further pair of bearing blocks 43 which are fixedly secured to the forward axial end face of the ring 26 by means of screws 44. The bearing blocks 43 are substantially identical to the bearing blocks 27 but are angularly displaced therefrom by an angle of approximately 90°.

Each of the pivot devices 42 includes an elongated pivot pin 46 which is substantially identical to the pivot pins 31 described above. The pivot pin 46 has a threaded shank portion 47 on the inner end thereof which is threadably engaged within a threaded aperture formed in the arbor 41. The pair of pivot pins 46 are coaxially aligned and are each fixedly connected to and extend substantially radially outwardly relative to the arbor 41. Further, each pivot pin 46 has an enlarged cylindrical head portion 48 on the radially outer end thereof, which head portion is rotatably disposed within an enlarged opening formed within the respective bearing block 43. A suitable ball bearing assembly 49 is disposed between the head portion 48 and the respective bearing block 43 for permitting relative rotation between the bearing block and the pivot pin, while also permitting limited axial movement therebetween.

The bearing assembly 49 is retained within the bearing block by means of an integral lip 51 formed adjacent the outer end of the opening and a bearing retainer 52 positioned adjacent the inner end of the opening. An annular resilient compression washer 53 encircles each pivot pin 46 and is positioned in the space between the inner surface of the bearing block 43 and the outer surface of the arbor 41 for maintaining the arbor properly centrally positioned relative to the intermediate support 12. The compression washers 53 are substantially identical to the compression washers 38 described above, being constructed of a suitable resilient and compressible rubber-like material. The washers 53 normally maintain the arbor 41 properly centrally positioned between the bearing blocks 43, while at the same time the compressibility of the washers 53 permits the arbor 41 to be laterally displaced a limited amount in a direction substantially parallel to the axis B as defined by the coaxially aligned pivot pins 46.

Further, as is readily apparent from inspection of the drawings, the pivot axis A defined by the pivot pins 31 is substantially perpendicular to and intersects the pivot axis B defined by the pivot pins 46. Also, the axes A and B are both substantially transverse to and intersect the longitudinal axis C of the tool holder 13 when same is properly centrally positioned. The longitudinal axis C of the tool holder 13 constitutes the rotational axis of the tool when same is mounted within the holder 13.

Figure 4:
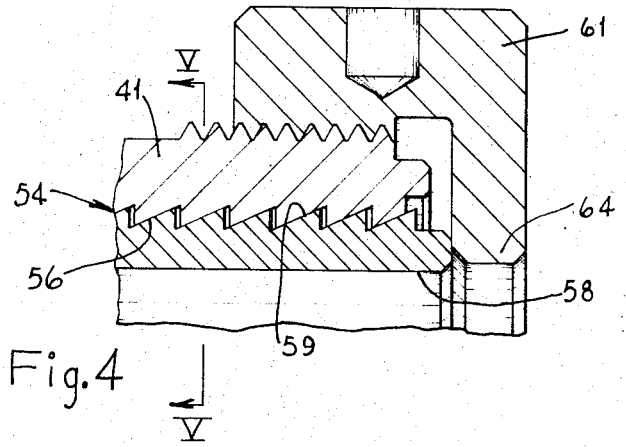
FIG. 4 is an enlarged, fragmentary sectional view of a portion of the tool holder.
Figure 5:
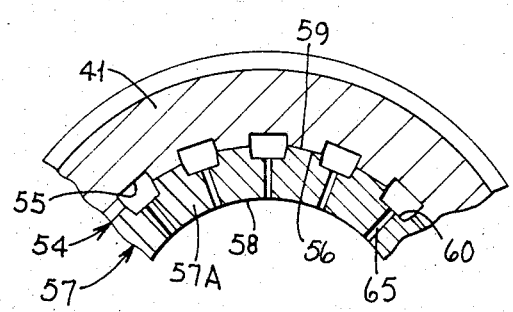
FIG. 5 is a fragmentary sectional view taken along the line V—V of FIG. 4.

As illustrated in FIGS. 2 and 3, the arbor 41 is provided with a central bore extending axially therethrough, which bore adjacent its forward end is surrounded by a series of circumferentially spaced, axially extending cam rows 54, each of which is comprised of a series of axially spaced, ramp-like cams 56. The cams 56 project radially inwardly and are fixedly, here integrally, connected to the arbor 41. Each cam 56, as illustrated in FIG. 4, is relatively long and extends at a suitable, relatively small angle with respect to the longitudinal axis of the arbor 41. The rear face of each cam 56, in the illustrated embodiment, extends at a large angle which approximates but is generally slightly less than 90° relative to the axis of the arbor 41. The adjacent axially extending rows 54 are provided with axially extending slots 55 therebetween, which slots are preferably of approximately the same circumferential width as the cam rows. The individual cams 56 are also preferably arranged in separate circumferential rows, whereby each circumferential row includes therein a cam 56 from each of said axially extending rows 54.

The work holder 13 also includes a contractable tool engaging member 57 disposed within the bore defined by the arbor 41. The tool engaging member 57 comprises a substantially cylindrical sleeve or collar having a tool receiving opening 58 therein. The collar 57 has a series of alternately arranged slits 65 formed therein and extending axially thereof, which slits divide the collar into a plurality of axially elongated segments 57A which are movable substantially radially with respect to each other to a limited extent. The segments 57A are connected to each other by end portions which are located at alternately opposite axial ends of the slits. The outer surface of the collar 57 is provided with a series of circumferentially spaced axially extending cam rows, each comprising a series of axially spaced ramp-like cams 59, and circumferentially spaced apart by intermediate axially extending slots 60. The cross sectional shape, size and spacing of the cams 59 are substantially the same as those of the cams 56 whereby said cams 56 and 59 are adapted to interfit. The slots 60 and 55 as formed in the collar 57 and arbor 41, respectively, are of sufficient radial depth that the cams 56 and 59 are movable axially therethrough. Thus, the arbor 41 and the collar 57 can be assembled by aligning the cam rows of the collar within the slots of the arbor, which also aligns the cam rows of the arbor with the slots of the collar, whereupon the parts are then telescoped until the cams 59 are circumferentially aligned with the selective spaces between the cams 56. The contractable collar 57 is then rotated sufficiently with respect to the arbor 41 to effect interengagement of the cams 56 and 59. In this position, the slots 55 of the arbor will then be radially aligned with the slots 60 formed in the collar.

If desired, suitable elongated keys can be inserted into the aligned slots 55 and 60 to positively prevent relative rotation therebetween. However, since there is little tendency for the collar to rotate with respect to the arbor due to the substantial deflection which exists between the cams 56 and 59, the keys can be entirely omitted if desired, or alternately the keys can be constructed from a resilient plastic material.

Further details of the cam rows and key structure, and of the manner in which the contractable collar fits within the arbor, are illustrated in greater detail in my prior U. S. Pat. No. 3,117,797, and in my copending application, Ser. No. 76,884, filed Sept. 30, 1970. Thus, further description thereof is not believed necessary.

Considering now the remainder of the work holder 13, same also includes an annular nut 61 which has an internally threaded outer hub portion 62 disposed in threaded engagement with the externally threaded portion 63 formed on the forward end of the arbor 41. The nut 61 also has a radially inwardly directed flange portion 64 which is adapted to abut the forward end of the collar 57 for pushing the collar 57 axially inwardly relative to the arbor 41 in response to rotation of the nut 61.

To assist in centrally positioning the arbor 41, and to prevent the housing 11 from collecting therein contaminating materials, there is additionally provided a resilient seal ring 67, here an O-ring, disposed between the arbor and the housing. The seal ring 67 particularly coacts between the housing lip 23 and a radially directed shoulder 66 as formed on the arbor 41. The seal ring 67 thus substantially sealingly closes the forward end of the housing while at the same time it enables the arbor 41 to angularly or laterally move relative to the housing to permit alignment of the tool with the bore or opening formed in the workpiece.

While the invention as described above utilizes resilient elastomeric compression washers 38 and 53, it will be apparent that other suitable spring devices could be used. For example, the washers 38 and 53 could be conventional metal spring washers or could be constructed as Belleville spring members.

OPERATION

When the floating tool holder assembly 10 is to be utilized to permit a secondary operation to be performed on a bore formed within a workpiece, the appropriate work tool is first positioned so that the shank of the tool is disposed within the opening 58 defined by the collar 57. Nut 61 is then rotated to move same rearwardly (leftwardly in FIGS. 2 and 3) of the arbor 41, which rotation of nut 61 causes the flange 64 to abut the forward end of the collar 57 so that the collar 57 is pushed axially inwardly. Due to the coaction between the cams 56 and 59, the inward movement of the collar 57 causes same to radially contract into snug gripping engagement with the shank of the tool.

The tool is then inserted into the bore formed in the workpiece to permit performance of a further operation thereon, such as to permit reaming or threading of the bore. In the event that the bore is not properly aligned with the longitudinal axis of the tool, the tool can be both laterally and angularly displaced a limited amount due to the universal type of mounting provided between the arbor 41 and the housing 11. Particularly, the arbor 41 is free to pivotally move about both of the transverse axes A and B, whereupon the arbor and the tool mounted therein can thus be angularly tilted within any radial plane so as to compensate for any misalignment of the bore formed in the workpiece. Further, due to the compression capabilities of the wahsers 38 and 53, and the permissible relative axial movement between the support pins and the surrounding support blocks, the complete tool holder 13 can also be laterally displaced a limited amount as permitted by the cmpression of the washers. In this manner, the tool can be angularly and/or laterally displaced to thereby overcome any type of misalignment which may exist between the tool holder and the workpiece.

After the tool has been inserted into the bore of the workpiece, the machine tool is activated to cause rotation of the spindle plate 18, which in turn causes rotation of the work holder assembly 10 so that the tool is then rotated relative to the workpiece to permit performance of the desired finishing operation. After the desired finishing operation has been completed, the relative rotation is stopped and the tool axially withdrawn relative to the workpiece. After the tool has been withdrawn from the workpiece, the compression and resiliency of the washers 38 and 53 will cause the tool holder 13 to return to its normally centrally aligned position, whereby the tool is again properly positioned in its normal central location to permit performance of a further finishing operation.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A floating tool holder assembly, comprising:
   housing means;
   intermediate support means disposed substantially concentric with said housing means;
   work holder means substantially concentric with said intermediate support means, said work holder means including means for permitting gripping of a tool;
   first pivot means connected between said housing means and said support means for permitting limited pivotal movement of said support means about a first axis which is substantially perpendicular to the longitudinal axis of said work holder means;
   second pivot means connected between said support means and said holder means for permitting limited pivotal movement of said holder means relative to said support means about a second axis which is substantially perpendicular to the longitudinal axis of said holder means, said second axis being substantially angularly inclined relative to said first axis; and
   resilient means coacting between said holder means and said housing means for permitting lateral displacement of said holder means relative to said housing means in a direction substantially perpendicular to said longitudinal axis in response to imposition of an external force on said holder means, said resilient means causing said holder means to automatically return to a central position when said external force is relieved, said resilient means including first resiliently compressible means coacting between said housing means and said intermediate support means for permitting lateral movement of said intermediate support means relative to said housing means in a direction substantially parallel to said first axis; and
   said resilient means also including second resiliently compressible means coacting between said intermediate support means and said holder means for permitting lateral movement of said holder means relative to said intermediate support means in a direction substantially parallel to said second axis.

2. A tool holder assembly according to claim 1, wherein said first pivot means includes a pair of coaxially aligned first pivot pins disposed adjacent diametrically opposite sides of said housing means and interconnecting said housing means to said intermediate support means; and
   said first resiliently compressible means including a resilient washer-like spring member disposed in surrounding relationship to each of said first pins and positioned between adjacent portions of said housing means and said intermediate support means for normally urging the adjacent portions away from one another.

3. A tool holder assembly according to claim 2, wherein said second pivot means includes a pair of coaxially aligned second pivot pins disposed adjacent diametrically opposite sides of said holder means and interconnecting said holder means to said intermediate support means, said second pins being angularly spaced from said first pins by an angle of approximately 90°; and
   said second resiliently compressible means including a further resilient washer-like spring member disposed in surrounding relationship to each of said second pins, said second washer member being disposed between adjacent portions of said holder means and said intermediate support means for normally resiliently urging the adjacent portions away from one another.

4. A tool holder assembly according to claim 3, wherein said washer-like spring members are constructed of a resilient rubber-like material.

5. A tool holder assembly according to claim 1, wherein said holder means includes a sleeve-like arbor having a plurality of circumferentially spaced, axially extending rows of ramp-like cams formed on the inner periphery thereof;
   said holder means further including a contractable sleeve-like collar having a plurality of circumferentially spaced rows of ramp-like cams formed on the external periphery thereof and positioned for coaction with the cams formed on the arbor; and
   means coacting between said arbor and said collar for causing relative axial movement therebetween whereby said collar is radially contracted into gripping engagement with the shank of a tool positioned within the interior of said collar.

6. A tool holder assembly according to claim 1, wherein said housing means includes an elongated sleeve portion having the free end thereof disposed closely adjacent and in surrounding relationship to said holder means, and a resilient annular seal element disposed between and substantially sealingly engaged with said holder means and the free end of said sleeve portion.

7. A tool holder assembly according to claim 1, wherein said housing means includes an annular housing member disposed in surrounding relationship to said intermediate support means;
   said first pivot means including a pair of coaxially aligned pivot pins fixedly secured to said housing member and projecting radially inwardly therefrom toward said intermediate support means, and antifriction bearing means coacting between said first pivot pins and said intermediate support means for permitting relative pivotal movement therebetween about said first axis;
   said holder means includes a sleeve-like member positioned substantially concentrically within said intermediate support means; and
   said second pivot means including a pair of coaxially aligned second pivot pins fixedly secured to diametrically opposite sides of said sleeve-like member, said second pivot pins extending radially outwardly from said sleeve-like member, and second antifriction bearing means coacting between said second pivot pins and said intermediate support means for permitting relative pivotal movement therebetween about said second axis.

8. A tool holder assembly according to claim 7, wherein said intermediate support means includes an annular ring-like member positioned within said annular housing member and positioned adjacent the inner axial end of said sleeve-like member, said intermediate support means including a first pair of axially projecting bearing blocks fixedly secured to one axial end face of said ring-like member adjacent diametrically opposite sides thereof, said bearing blocks rotatably receiving therein the radially inner ends of said first pins; and said intermediate support means including a second pair of axially extending bearing blocks fixedly secured to said one axial end face of said ring-like member adjacent opposite diametrical sides thereof, said second bearing blocks being disposed between and angularly spaced from said first bearing blocks by an angle of approximately 90°, and said second bearing blocks rotatably receiving therein the radially outer ends of said second pivot pins.

9. A tool holder assembly according to claim 8, wherein said first resiliently compressible means includes a first annular washer member constructed of a resilient material and disposed in surrounding relationship to each of said first pivot pins, said first washer member being compressibly positioned between the inner periphery of said annular housing member and the outer surface of said first bearing block; and said second resiliently compressible means also including a second annular washer member constructed of a resilient material and positioned in surrounding relationship to each of said second hinge pins, said second washer member being compressibly positioned between the inner surface of said second bearing block and the outer periphery of said sleeve-like member.

* * * * *